(No Model.)
A. S. HAINES.
SYSTEM OF IRRIGATION.
No. 379,392. Patented Mar. 13, 1888.
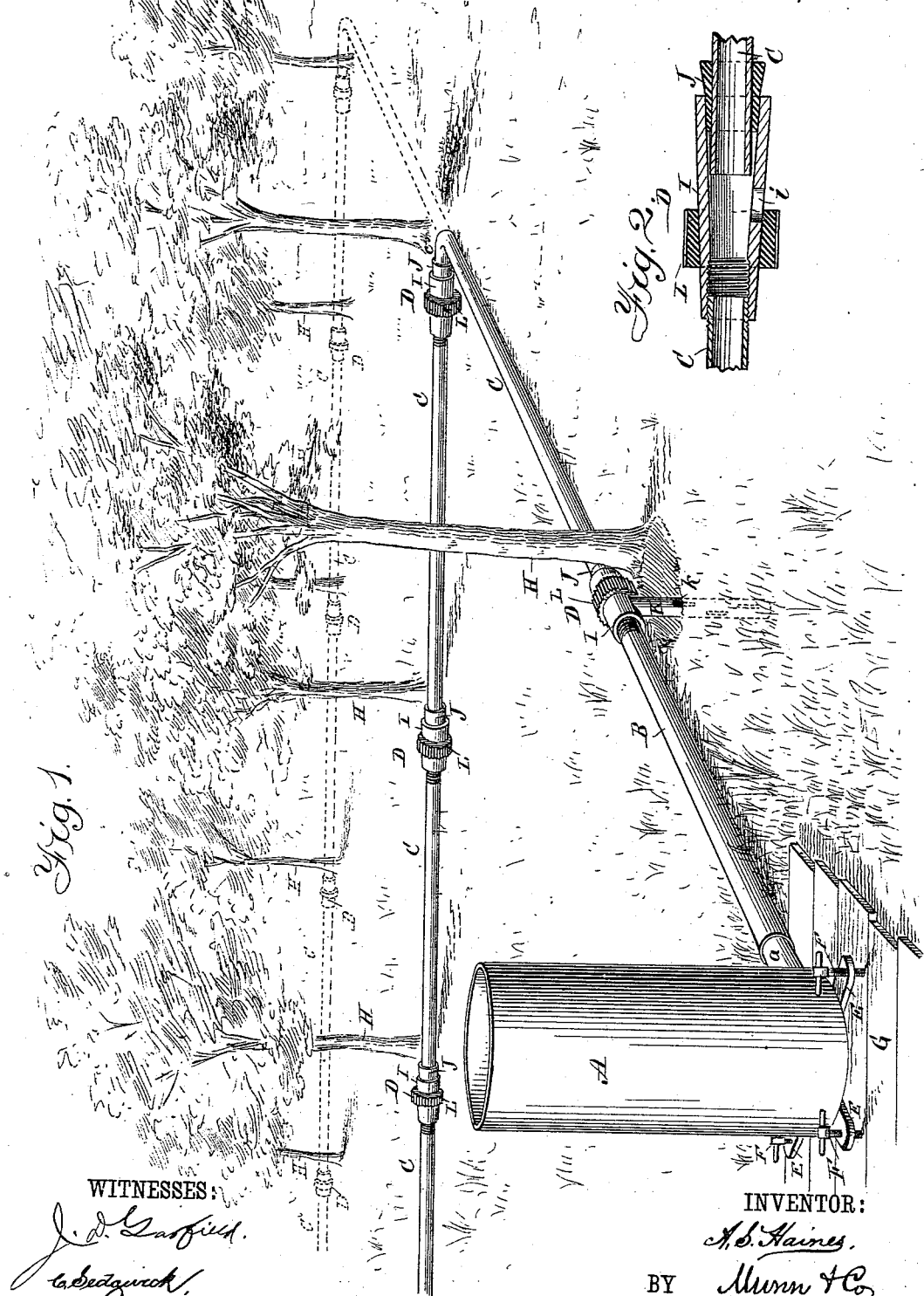
WITNESSES:
INVENTOR:

UNITED STATES PATENT OFFICE.

AUGUSTIN S. HAINES, OF NASHVILLE, IOWA.

SYSTEM OF IRRIGATION.

SPECIFICATION forming part of Letters Patent No. 379,392, dated March 13, 1888.

Application filed July 16, 1887. Serial No. 244,507. (No model.)

*To all whom it may concern:*

Be it known that I, AUGUSTIN S. HAINES, of Nashville, in the county of Jackson and State of Iowa, have invented a new and Improved System of Irrigation, of which the following is a full, clear, and exact description.

My invention relates to a system of irrigation for lands, and more particularly for orchards or other tree-planted areas, and has for its object to provide a simple efficient pipe and water-supply system for thoroughly irrigating the lands at the roots of the trees without waste of water and with economy of time and labor.

The invention will first be described, and then will be particularly pointed out in the claims.

Reference is to be had to the accompanying drawings, forming a part of this specification, in which similar letters of reference indicate corresponding parts in both figures.

Figure 1 is a perspective view illustrating the application of my improved system of irrigation to an orchard, and Fig. 2 is an enlarged longitudinal detail sectional view of the valved couplings of the irrigating-pipes.

In carrying out my system of irrigation I employ a water-tank or reservoir, A, and delivery-pipes B C, communicating with the tank and connected to each other by couplings D, of peculiar construction, and in a manner presently explained.

The tank A has a suitable base, from which extend lugs E, fitted with screws F, which may be adjusted in the lugs for leveling the tank upon any approved floor or sill-frame G, laid on the ground—in an orchard, for instance, the trees H of which are to be irrigated in accordance with my invention.

One end of the first delivery-pipe B is fitted, by a screw-joint or otherwise, to a spout or outlet-pipe, *a*, fixed to the tank A, and the other end of the pipe is screwed into one end of a metal tube, I, which forms the main portion of the coupling D and enlarges or flares toward its other end, whereto is fitted by a slip-joint the end of the next delivery-pipe, C, of a series of such pipes, which may extend for any required distance over the land to be irrigated. The end of the pipe C is provided with a rubber packing, J, which fits into the tapering smooth bore of the coupling-tube I and makes a water-tight joint therewith, which may readily be broken when disconnecting the pipes to lay them in a new place. The other end of the first pipe C will be screwed into the small end of the tube I of the second coupling D, while the end of a second pipe C will be fitted by a rubber packing into the large end of the second coupling when a series of pipes C are to be laid in alignment with the first pipe B; but when the pipes C are to be laid at an angle either to one side or the other I will connect the pipes C C at the angle by slipping the bent end *c* of one pipe, which will be provided with a packing, J, into the larger tapering end of the tube I of the adjacent coupling D, and the first pipe C on the angularly-ranging line of pipes will be screwed into the smaller threaded end of the tube I of this coupling, and the successive pipes C will be connected to each other in any required number by couplings D, in a manner readily understood from the above description and the drawings.

The pipes B C will be of such length that their couplings D will lie next the trunks of the trees H and directly above the roots of the trees; and the tube I of each coupling is provided at its lower part with a slot, *i*, from which water flowing through the pipes may discharge either directly onto the ground or into a pipe, K, which is set or driven into the earth next the tree-trunk, and is provided with a series of side slots or holes, *k*, from or through which the water dropping from the slot or passage *i* of the coupling will pass directly to the roots of the tree. This pipe K, which is shown in the foreground of Fig. 1 of the drawings, is preferably open at the bottom, and is also open at the top, thus allowing free exit of water, as far as necessary, beneath the ground surface, and giving free access to the interior of the pipe to clean it through its upper end when the coupling D is shifted a little from the top of the pipe.

To regulate the flow of water from the slots or passages *i* of the pipe-couplings, I use a rubber or elastic sleeve or collar, L, which is slipped onto the tapering tube I of each coupling, and may be moved endwise of the tube to open the passage *i* more or less, as may be required, to give ample water-supply and avoid waste of the water.

The angularly-ranging line of pipes C (shown in full lines in Fig. 1 of the drawings) extends along one row of trees H in the orchard, and when these trees have been sufficiently irrigated another length of pipe or a second pipe C will be coupled to the first pipe C, and the angularly-ranging line of pipes will be shifted to irrigate the next row of trees H, and, as will be understood from the dotted lines in the drawings, all the trees of an orchard may thus be irrigated by flow of water from the tank A through the delivery pipes B C, and the work may be accomplished with great economy of time and labor as compared with a system of ditching the ground which requires leveling of it to a considerable extent.

With the pipe system above described the irrigation will be complete and effective, as the water will be discharged only where wanted, or at the roots of the trees or plants, and irrespective of the contour of the ground surface, and the pipes may be passed directly under trees whose branches lie close to the ground-surface to water them directly at the roots, and which could not be effectively done by ditches, which could not be cut close enough to the tree-trunks for the purpose, as will readily be understood.

Having thus described my invention, what I claim as new, and desire to secure by Letters Patent, is—

1. In a system of irrigation, the combination, with pipes laid along the surface of the ground and connected to each other by couplings having water-outlet passages, of a separate and independent pipe or pipes, one of each three driven or set into the ground, and adapted to receive water from the outlets of the main distributing-pipes and to discharge it below the ground-surface, substantially as herein set forth.

2. In a system of irrigation, the combination, with water-delivery pipes screw-threaded at one end and provided with a packing, J, at the other end, of a coupling, I, screw-threaded at one end to receive the threaded end of one pipe, and having a tapering bore at the other end to receive the end of another pipe having a packing, J, and said coupling provided with an outlet-passage, $i$, substantially as described, for the purposes set forth.

AUGUSTIN S. HAINES.

Witnesses:
B. F. THOMAS,
M. L. KIRBY.